(12) United States Patent
Yasumoto et al.

(10) Patent No.: US 7,267,740 B2
(45) Date of Patent: Sep. 11, 2007

(54) VIBRATION-DAMPING DEVICE FOR VEHICLES AND METHOD OF MANUFACTURING THE SAME

(75) Inventors: Yoshinori Yasumoto, Kasugai (JP); Kouichi Maeda, Nishikamo-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 192 days.

(21) Appl. No.: 11/125,115

(22) Filed: May 10, 2005

(65) Prior Publication Data
US 2005/0253317 A1    Nov. 17, 2005

(30) Foreign Application Priority Data
May 14, 2004  (JP) .............................. 2004-145348

(51) Int. Cl.
*B29C 65/00* (2006.01)
(52) U.S. Cl. ................ 156/294; 29/896.93; 267/141.2; 188/378
(58) Field of Classification Search .................. 56/294, 56/60, 130.5; 188/378, 379; 29/896.93
See application file for complete search history.

(56) References Cited

U.S. PATENT DOCUMENTS

| | | | |
|---|---|---|---|
| 2,714,161 A | 7/1955 | Featherstun | |
| 3,612,222 A | 10/1971 | Minor | |
| 5,326,324 A * | 7/1994 | Hamada | 464/180 |
| 6,439,359 B1 | 8/2002 | Kato et al. | |
| 6,494,444 B2 * | 12/2002 | Hasegawa | 267/141 |
| 6,536,566 B2 | 3/2003 | Hasegawa et al. | |
| 6,554,112 B2 * | 4/2003 | Kato et al. | 188/379 |
| 6,641,119 B2 | 11/2003 | Kato | |

FOREIGN PATENT DOCUMENTS

| | | |
|---|---|---|
| JP | U-57-52305 | 9/1955 |
| JP | U-64-42591 | 3/1989 |
| JP | C2-125878 | 5/1990 |
| JP | U-3-86227 | 8/1991 |
| JP | U-4-46246 | 4/1992 |
| JP | 09-329182 A | 12/1997 |
| JP | 2001-241493 A | 9/2001 |
| JP | 2001-241495 A | 9/2001 |
| JP | 2002-213523 A | 7/2002 |
| JP | 2002-227921 A | 8/2002 |
| JP | 2002-242984 A | 8/2002 |

* cited by examiner

*Primary Examiner*—Melanie Torres
(74) *Attorney, Agent, or Firm*—Oliff & Berridge PLC

(57) ABSTRACT

A vehicle vibration-damping device including a rigid housing and an independent mass member housed in the housing and having a metallic mass of circular shape in section and a rubber elastic body layer adhered to the metallic mass. A distance of a gap between opposing surfaces of the housing and the metallic mass in the radial direction, with the housing and metallic mass disposed coaxially, is set to between 0.5 and 2 mm. The rubber elastic body layer is formed around an entire outer peripheral surface of the metallic mass by a vulcanization molding of a rubber material filling the gap, and thermal contraction is used both to cause the rubber elastic body layer to peel from the housing and to cause it to adhere onto the outer peripheral surface of the metallic mass to thereby fabricate a small gap of no more than 0.1 mm. A method of manufacturing the same is also disclosed.

3 Claims, 7 Drawing Sheets

VIBRATION-DAMPING DEVICE FOR VEHICLES AND METHOD OF MANUFACTURING THE SAME

INCORPORATED BY REFERENCE

The disclosure of Japanese Patent Application No. 2004-145348 filed on May 14, 2004 including the specification, drawings and abstract is incorporated herein by reference in its entirety.

BACKGROUND OF THE INVENTION

1. Field of the Invention

The present invention relates to a vibration-damping device for use in a vehicle, which reduces vibrations excited in vibrating members of the vehicle, and more particularly to a vehicle vibration-damping having a novel structure capable of exhibiting effective vibration-damping performance when being applied to vibrating members such as transmission cases, suspension arms, sub-frames, body panels, engine units, mount brackets, exhaust system components, and so forth.

2. Description of the Related Art

Conventional known means for reducing vibration that are problematic in vehicles, such as automobiles, includes: (1) mass dampers wherein masses are affixed to the vibrating members, (2) dynamic dampers wherein masses are connected to the vibrating member, and supported by, a spring, and (3) vibration-damping materials wherein sheet-shaped elastic materials are adhered to the surfaces of the vibrating members. However, the (1) mass dampers and (2) dynamic dampers not only have problems in that they require large masses, but also that the range of frequencies over which there is effective vibration-damping is narrow. Moreover, the (3) vibration-damping materials have a problem in that not only is a large adhesive surface area required, but the mass is large as well. Furthermore, the (2) dynamic damper and (3) vibration-damping materials have temperature dependencies in the vibration-damping effect, and hence there is a problem in that it is difficult to obtain the desired stability in the vibration-damping effect.

In order to address problems such as those described above, JP-A-2001-241493 and JP-A-2002-213423, for example, disclose vibration-damping devices for vehicles of an attenuation-impact type wherein an independent mass member is disposed within a housing affixed to the vibrating member, with a gap of a specific size interposed therebetween, and without being adhesive to the housing, so that the independent mass can move relative to the housing. Upon input of vibrations, the independent mass member is forced to move relative to the housing in the vibration input direction to strike the housing through an elastic member, whereby vibration-damping effect is obtained through the use of energy loss due to sliding friction and collision when there are impacts between the independent mass member against the housing. This type of vehicle vibration-damping device affords the advantage of smaller mass when compared to the various types of conventional vibration-damping devices described above (such as the dynamic damper), but also that it is possible to obtain excellent vibration-damping effect relative to many different and broad ranges of vibration through tuning the resonant frequency of the vibration-damping device by appropriately changing the settings of, for example, hardness or modulus of elasticity of the elastic member, or the gap between the elastic member and either the mass member or the housing, depending on the resonant frequency of the objective vibrating member for which the vibration is to be controlled.

However, in recent years, this type of attenuation impact-type vibration-damping device for automobiles have been subjected to calls for even more sophisticated anti-vibration characteristics. In particular, there are cases wherein there are calls for improvements in the vibration-damping effects for vibrations in even higher frequency bands.

With this regards, the extensive studies conducted by the inventors have discovered that the attenuation impact-type vibration-damping device described above suffers from a problem that the vibration-damping effect is greatly reduced for vibrations in high frequency bands higher than the resonant frequency at which the independent mass member undergoes jumping displacement relative to the housing.

In order to cope with these problems, one may consider, for example, increasing the spring constant of the elastic member at the striking part of the mass member against the housing to increase the resonant frequency of the independent mass member. However, in order to increase the resonant frequency to several hundred hertz or above, the elastic member will be extremely hard, due to the increase in the spring constant of the elastic member. This results in a tendency for the striking noise and the shock to be problematic when the elastic member strikes the housing, and thus this is not always an effective approach.

SUMMARY OF THE INVENTION

It is therefore one object of this invention to provide a vibration-damping device for use in a vehicle with a novel structure that effectively exhibiting the desired vibration-damping effect through the setting of the natural frequencies of the independent mass members to higher frequency bands than the natural frequencies of the vibrating members for which the vibrations are to be controlled, while maintaining the spring component of the rubber elastic body layer in the independent mass members.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the present invention relates to a vehicle vibration-damping device. According to a first mode of the first aspect of the invention, provided is a vehicle vibration-damping device adapted to be installed on a vibrating member to damp vibrations excited therein, comprising: a rigid housing having a cylindrical inner peripheral surface, that is adapted to be attached to the vibrating member; and an independent mass member including a metallic mass having a circular shape in cross section, and a rubber elastic body layer adhered to an outer peripheral surface of the metallic mass, the independent mass member being housed within the housing with a gap therebetween in a radial direction corresponding to a primary vibration input direction so that the independent mass member is movable relative to the housing in the primary vibration input direction, the vibration-damping device being capable of exhibiting a vibration-damping effect based on the independent mass member moving relative to the housing, and striking the housing, when a vibration is applied, wherein a distance between opposing surfaces of the inner peripheral surface of the housing and the outer peripheral surface of the metallic mass in the radial direction, when the housing and metallic mass are disposed coaxially, is set to between 0.5 and 2 mm, and wherein the rubber elastic body layer is formed around an entire outer peripheral surface of the metallic mass by a vulcanization molding of a rubber material filling the gap between the inner peripheral surface of the housing and the outer peripheral surface of the metallic mass, and thermal contraction is used both to cause the rubber elastic body layer to peel from the housing and to cause it to adhere onto the outer peripheral surface of the metallic mass to thereby fabricate a small gap of no more than 0.1 mm, between the opposing surfaces, when the rubber elastic layer member and the housing are disposed coaxially, so that a natural frequency of the independent mass member is set to a frequency band that is higher than a natural frequency of the vibrating member so that the metallic mass is repetitively strike the inner surface of the housing on both sides in the primary vibration input direction through the rubber elastic body layer when a vibration is applied.

In a vehicle vibration-damping device of construction according to this mode, the use of the cylindrically-shaped inner peripheral surface of the housing and metallic mass that is circular in its cross section makes it possible to stabilize and cause the independent mass member to strike the housing when a vibration is applied in the radial direction. In addition, the small gap that is formed between the facing surfaces of the rubber elastic body layer and the inner peripheral surface of the housing in the radial direction, is no more than 0.1 mm. As a result, reduced is the amount of movement required for the independent mass member to come to impact against the inner surfaces on both sides of the housing in the vibration input direction, causing desirable impacts of the independent mass member against the inner surface of the housing on both sides of the housing in the vibration input direction. This makes it possible to tune the independent mass member to the high frequency band, which ultimately could not be achieved by the prior technology.

The vibration-damping device of this mode is able to set the resonant frequency of the independent mass member to an adequately high frequency band through the structure described above, without having the dynamic spring constant of the rubber elastic body layer be extremely large. With this arrangement, it is possible to avoid problems with striking noises, impacts, and the like, accompanying the striking of the independent mass member that would result from the rubber elastic body layer being too hard due to the high spring constant, making it possible to exhibit an extremely effective vibration-damping performance over an extremely broad frequency band, ranging from low frequency bands through high frequency bands.

While the technological theory that makes it possible to achieve the results described above is not yet fully clear, the following may be considered: In a state wherein the independent mass members are dislocated so as to be off of the housing, and are in an essentially floating state, since the rubber elastic body layer spring does not operate in this state, it may be that increase in the hardness of the spring of the rubber elastic body layer will have very little contribution to increasing the resonance frequency. In the vibration-damping device of construction according to the present mode of the invention, on the other hand, it is possible to use effectively the spring effect of the rubber elastic body layer, since the independent mass member can be brought into impact against the housing at both ends of the movement. Additionally, by having an extremely small gap, i.e., a gap of no more than 0.1 mm in the radial direction between the facing surfaces of the outer peripheral surface of the independent mass member and the inner peripheral surface of the housing, the amount of float time wherein the independent mass member is off of the housing can be reduced substantially, making it possible for the spring effect of the rubber elastic body layer to be effective over a longer period of time. Accordingly, it may be possible to increase substantially the resonance frequency of the independent mass member through using effectively the spring effect of the rubber elastic body layer without increasing the spring constant of the rubber elastic body layer as much.

Also, in this embodiment of the invention, the size of the small gap and the distance between the surfaces that are facing each other in the radial direction, those being the inner peripheral surface of the housing and the outer peripheral surface of the metallic mass, under the condition that the housing and the metallic mass are disposed coaxially, are not limited in any way, but rather it is possible to change both settings independently, as appropriate, depending on the required vibration-damping results, required manufacturability and so forth. Moreover, meant by the size of the small gap and the distance, in the radial direction, between opposing surfaces those being the inner peripheral surface of the housing and outer peripheral surface of the metallic mass, is the size of the small gap and the distance between opposing surfaces on each of the individual small gaps and distances between opposing surfaces that are produced on both sides, with the central axis there between, on radial lines that pass through the central axis of the housing and of the independent mass members under the condition that the housing and the independent mass members are coaxial. Furthermore, the small gap should be formed at at least one part of the surfaces that oppose each other in the radial direction, those being the inner peripheral surface of the housing and the outer peripheral surface of the rubber elastic body layer, under the condition that the housing and the rubber elastic body layer member are disposed coaxially. Preferably, in consideration of stabilizing the impacts of the independent mass members with the housing, the small gap is fabricated along the entirety of the space between the opposing surfaces.

A second mode of the first aspect of the invention provides a vehicle vibration-damping device according to the first mode, wherein in the case where the vibration-damping device is disposed in a state where the primary vibration input direction is approximately vertically oriented and is subjected to at least 2G input vibration, the independent mass member undergoes repetitive strike against the inner peripheral surface of the housing on both sides of the housing in the primary vibration input direction.

A third mode of the first aspect of the invention provides a vehicle vibration-damping device according to the first or second mode, wherein at least one through hole is fabricated in the housing in a position that avoids the part wherein the independent mass member strikes the housing when a vibration is applied in the primary vibration input direction.

A fourth mode of the first aspect of the invention provides a vehicle vibration-damping device according to any one of the first through third modes, wherein an outer peripheral surface of the rubber elastic body layer and the inner peripheral surface of the housing are fabricated so as to extend in the axial direction with approximately uniform cross sections so that the small gap that is fabricated between the outer peripheral surface of the rubber elastic body layer and the inner peripheral surface of the housing is approximately uniform along the entire length in the axial direction.

A second aspect of the present invention relates to a method of manufacturing a vehicle vibration-damping device. According to a first mode of the second aspect of the invention, provided is a method of manufacturing a vehicle vibration-damping device comprising: (a) a gap fabricating process that fabricates a gap of 0.5-2 mm between an inner peripheral surface of a rigid housing and an outer peripheral surface of a metallic mass, by rigidly positioning the housing having an inner peripheral surface of cylindrical shape and the metallic mass having a cylindrical cross section, relative to a vulcanization fabrication mold for fabricating a rubber elastic body layer, while by disposing the metallic mass coaxially disposed within the housing; (b) a rubber elastic body layer fabricating process wherein a rubber material is filled into the gap, and then is vulcanized to mold the rubber material within a mold cavity that is formed between the housing and the metallic mass in order to fabricate the rubber elastic body layer; and (c) a small gap fabricating process that fabricates a small gap of no more than 0.1 mm between the outer peripheral surface of the rubber elastic body layer and the inner peripheral surface of the housing that are opposed to each other in a radial direction, under a condition of the metallic mass being disposed coaxially within the housing, by utilizing a thermal contraction of the rubber elastic body layer to both peel the rubber elastic body layer from the housing and to adhere the rubber elastic body layer by means of reduction of an diameter thereof towards the metallic mass, wherein a natural frequency of the independent mass member that is formed by a tight adherence of the rubber elastic body layer to the outer peripheral surface of the metallic mass is set to be at a frequency band that is higher than a frequency of a target vibration that is to be damped for a vibrating member so that, upon application of the target vibration, the independent mass member repetitively strikes the inner surfaces of the housing on both sides in a primary vibration input direction.

A second mode of the second aspect of the invention provides a method of manufacturing a vehicle vibration-damping device according to the first mode, further comprising a preliminary process that performs at least one of an adhesion treatment for ensuring an adhesion of the rubber elastic body layer to the metallic mass, and a non-adhesion treatment for ensuring a non-adhesion of the rubber elastic body layer to the housing, prior to the rubber elastic body layer fabricating process.

A third mode of the second aspect of the invention provides a method of manufacturing a vehicle vibration-damping device according to the first or second mode, further comprising a release process that forcibly causes a relative movement between the rubber elastic body layer and the housing, in at least one of a circumferential direction and an axial direction, and that is executed posterior to the rubber elastic body layer fabricating process.

As will be apparent from the aforementioned explanation, by using a cylindrical housing and a metallic mass that has a circular cross section in the vibration-damping device for a vehicle that is structured according to the present invention, it is possible to stabilize the impact of the independent mass member on the housing. Also, the gap that is formed between the opposing surfaces of the rubber elastic body layer and the housing in the radial direction, is fabricated as a small gap of no more than 0.1 mm, thereby permitting the independent mass member to strike the inner surface of the housing in a desirable way on both sides of the housing in the primary vibration input direction, owing to the reduced amount of movement needing for the independent mass member to come to impact against the inner peripheral surface of the housing, on both sides thereof in the primary vibration input direction. Additionally, the small gap makes it possible to set the natural frequency of the independent mass member to be effectively at a higher frequency band than the natural frequency of the target-vibrating member whose vibration to be damped. Therefore, the vibration-damping device of construction according to the present invention is capable of exhibiting highly improved vibration-damping effect in comparison with vibration-damping devices with conventional structures.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
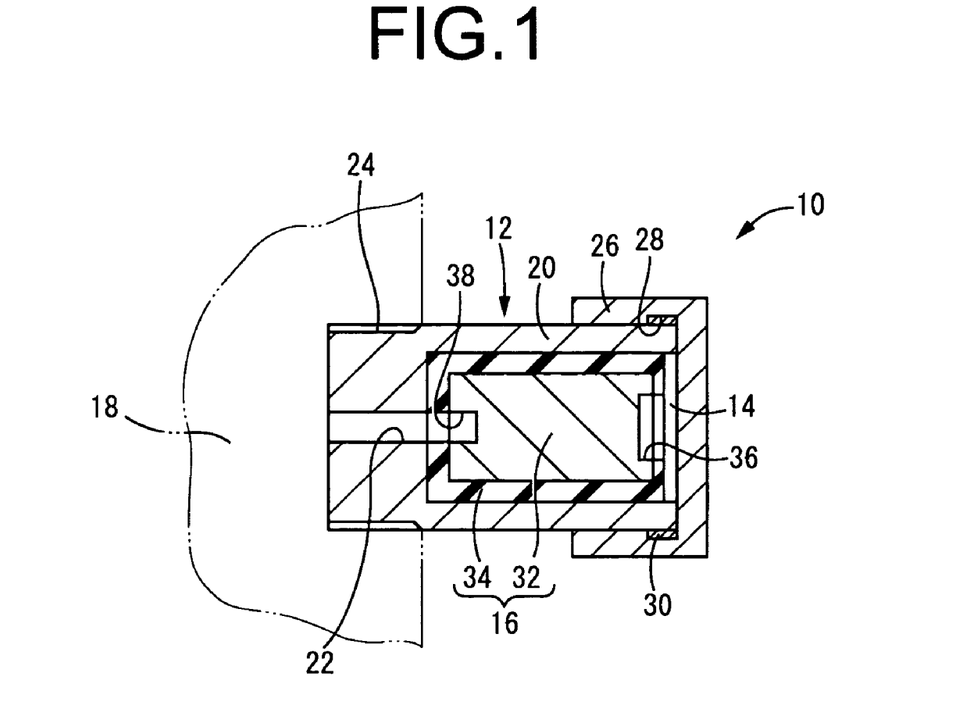
FIG. 1 is an elevational view in axial or vertical cross section of a vehicle vibration-damping device of construction according to a first embodiment of the invention.

Referring first to FIG. 1, there is shown a vibration-damping device 10 for use in a vehicle according to a first embodiment of the present invention. This vibration-damping device 10 has a structure wherein an independent mass member 16 is housed within a housing space 14 formed by a housing 12, and is installed at, for example, the free end of an automobile transmission case 18, such as shown by the double dotted lines in FIG. 1. In the explanation hereinbelow, the "up/down direction" or "vertical" direction, "axis-perpendicular direction," "radial direction," and so forth shall refer to the vertical direction in FIG. 1, unless otherwise specified, and the "left/right direction" or "horizontal direction," "axial direction," and so forth shall refer to the horizontal direction in FIG. 1.

More specifically, the housing 12 has approximately the shape of a cylinder that is closed at the bottom, where the cylinder wall part 20 extends in the axial direction with an approximately uniform circular cross-sectional shape extending from the bottom part side on one side in the axial direction (to the left in FIG. 1) to the opening part side in the axial direction on the other side (to the right in FIG. 1). Moreover, the housing 12 is fabricated from a hard material with a modulus of elasticity of at least $5 \times 10^3$ Mpa, and when the hard material is a metallic material such as an aluminum alloy, the housing 12 may be fabricated using a drawing process or a press process using a metal pipe or a metal plate. Alternatively, if the hard material is a synthetic resin material such as FRP, the housing 12 may be fabricated using injection molding, or the like.

The housing 12 is further provided with a through hole 22 perforated in the axial direction at the center of the bottom part of the housing 12. A male screw part 24 is formed at the outer circumferential surface of the bottom part of the housing 12.

A cover member 26 is fastened to an opening part of the housing 12. The cover member 26 has a shape that is approximately a hollow cylinder with a bottom, and the inner diameter dimension thereof is approximately the same as, or slightly larger than, the outer diameter dimension of the housing 12. On the inner circumferential surface of the cylinder wall part in the vicinity of the bottom part of the cover member 26, there is formed a housing groove 28, which opens towards the inner radial direction, and extends circumferentially over the entire circumference of the cover member 26.

The cover member 26 is press fit onto the housing 12, whereby the opening part of the housing 12 is provided with a fluid-tight sealing, causing the housing space 14 of the housing 12 to be a substantially sealed structure. When press fastening the cover member 26 onto the housing 12, a stop ring 30 is fitted into the housing groove 28 of the cover part 26. This stop ring 30 is formed by a ring-shaped spring metal, or the like, which extends discontinuously in the circumferential direction, and the inner diameter dimension thereof is smaller than the outer diameter dimension of the housing 12. With this arrangement, at the time of the press fit, the stop ring 30 that fits into the housing groove 28 is flattened in the outer radial direction of the housing 12, and based on the elastic effect, the stop ring 30 contracts in its diameter in the inner radial direction and is supported with a tight seal relative to the outer peripheral surface of the housing 12. Consequently, the mating in the axial direction of the stop ring 30 and the housing groove 28 effectively prevents the cover member 26 from falling off of the housing 12. The independent mass member 16 is disposed within the housing space 14 of the housing 12.

The independent mass member 16 comprises a metallic mass 32 and a striking rubber layer 34 as the rubber elastic body layer. The metallic mass 32 may be fabricated from a ceramic, a synthetic resin, or the like, or from an appropriate composite. However, in the present embodiment, it is fabricated from a metal with a high specific gravity, such as iron. Moreover, the metallic mass 32 has approximately a true cylindrical shape overall, extending in the axial direction with what is an approximately uniform circular cross-sectional shape. Furthermore, the outer diameter dimension of the metallic mass 32 is smaller than the inner diameter dimension of the housing 12 by a specific amount. The metallic mass 32 is formed with a large-diameter indentation 36 open in a central portion of one axial end face thereof on the cover member 26-side (i.e., the right in FIG. 1), and a small-diameter indentation 38 open in a central portion of the other axial end face (i.e., the left in FIG. 1) on the side of the bottom part of the housing 12.

In this embodiment, the metallic mass 32 is disposed within the housing space 14 of the housing 12, and also is placed so that the inner peripheral surface of the cylinder wall part 20 of the housing 12 and the outer peripheral surface of the peripheral wall part of the metallic mass 32 face each other with a specific gap distance (the distance between the facing surfaces) of $d_1$ (mm) in the radial direction along the entire length (see FIG. 2), in a state wherein the metallic mass 32 and the housing 12 are disposed so as to be coaxial. In other words, between the surfaces that face each other in the radial direction, those being the cylindrical wall part 20 of the housing 12 and the metallic mass 32, there is formed a gap 40 of a specific dimension. The dimension of this gap 40, or in other words, the distance in the radial direction between the inner peripheral surface of the cylindrical wall part 20 of the housing 12 and the outer peripheral surface of the peripheral wall part of the metallic mass 32, is $d_1$, where $d_1$=(dimension of the inner radius of the cylindrical wall part 20 of the housing 12—the outer radius dimension of the metallic mass 32)/2. It should be appreciated that the distance between facing surfaces $d_1$ is not limited in any way, and in the present embodiment, $0.5 \leq d_1 \leq 2$, and preferably, $d_1$ should be set so that $0.8 \leq d_1 \leq 1.5$. Furthermore, the small diameter indentation 60 is disposed coaxially with the through hole 22 that is perforated through the bottom part of the housing 12, and in a position facing thereto in the axial direction.

Moreover, on the surface of the metallic mass 32, except for at the large indentation 36 and the small indentation 38, there is a thin striking rubber layer 34 adhered with an essentially uniform thickness. In other words, the striking rubber layer 34 is adhered, with an essentially uniform thickness, to the outer peripheral surface of the peripheral wall part of the metallic mass 32 that is positioned facing, in the radial direction, the cylinder wall part 20 of the housing 12, the outer peripheral surface of the one axial end of the metallic mass 32 that is positioned facing, in the axial direction, the bottom part of the cover member 26 (i.e., to the right in FIG. 1), and to the outer peripheral surface of the other axial end of the metallic mass 32 that is positioned facing, in the axial direction, the bottom part of the housing 12 (i.e., to the left in FIG. 1). The striking rubber layer 34 that covers the outer peripheral surface of the axial end of the metallic mass 32 that is positioned facing, in the axial direction, the bottom part of the cover 26 has a smaller thickness dimension than the striking rubber layer 34 in the other positions.

The striking rubber layer 34, in consideration of durability and the reduction of the noise of impact when the metallic mass 32 strikes the housing 12, as will be described below, and in consideration of thermal contraction characteristics, and so forth. Preferably, the striking rubber layer 34 is fabricated from a rubber material such as natural rubber, a butyl rubber, or the like, with a shore D hardness of not greater than 85 according to the ASTM standard D2240, and more preferably with a shore D hardness, according to the same specification, between 55 and 80.

The thickness dimension t (mm) of the striking rubber layer 34 is expressed in terms of t=(outer diameter dimension of the striking rubber layer 34—inner diameter dimension of the metallic mass 32)/2, and there are no particular constraints on this thickness. In this embodiment, preferably, the thickness dimension t (mm) is determined to meet $0.4 \leq t \leq 1.99$, more preferably, $0.7 \leq t \leq 1.49$, where this thickness is less than the distance $d_1$ in the radial dimension between the opposing surfaces of the metallic mass 32 and the housing 12, as described above. As a result, under the condition that the striking rubber layer 34 and the housing 12 are disposed coaxially, a small gap 42, which extends in the axial direction with an approximately uniform ring-shaped cross section will be formed, as shown in the expanded view in FIG. 2, in the space wherein the outer peripheral surface of the striking rubber layer 34 faces the inner peripheral surface of the cylinder wall part 20 of the housing 12 in the radial direction.

The dimension $d_2$ (mm) of this small gap 42, or in other words, the distance $d_2$ between the facing surface of the outer peripheral surface of the striking rubber layer 34 and the inner peripheral surface of the cylindrical wall part 20 of the housing 12 is expressed in terms of $d_2$=(inner diameter dimension of the cylindrical wall part 20 of the housing 12—outer diameter dimension of the striking rubber layer 34)/2, or expressed differently, $d_2=d_1$ (which is the distance between the facing surfaces in the radial direction of the outer peripheral surface of the metallic mass 32 and the inner peripheral surface of the cylindrical wall part 20 the housing 12)—t (which is the thickness dimension of the striking rubber layer 34). Moreover, the dimension $d_2$ of the small gap 42, while having no particular constraints, is such that $0.01 \leq d_2 \leq 0.1$ in the present embodiment or preferably such that $0.02 \leq d_2 \leq 0.08$, or even more preferably set such that $0.02 \leq d_2 \leq 0.05$. Consequently, in the present embodiment, $0.02 \leq 2d_2 \leq 0.2$, or preferably $0.04 \leq 2d_2 \leq 0.16$, or more preferably $0.04 \leq 2d_2 \leq 0.1$ should be set as the total small gap dimension ($2d_2$) in the radial direction equipped in the vibration-damping device 10. Although it is not shown in the figure, it should be appreciated that this small gap 42 is formed also in the gap between facing surfaces in the axial direction between the outer peripheral surface of the striking rubber layer 34 that is coated onto the outer peripheral surface of the one axial end of the metallic mass 32 (i.e., towards the left in FIG. 1) and the inner peripheral surface of the bottom part of the housing 12.

Consequently, in the present invention, the axial-direction dimension of the independent mass member 16, comprising the metallic mass 32 and the striking rubber layer 34, is smaller than the axial-direction dimension of the housing space 14 of the housing 12, and the small gap 42, with its dimension $d_2$ is fabricated across the entire periphery between the facing surfaces of the outer peripheral surface of the striking rubber layer 34 and the inner peripheral surface of the cylindrical wall part 20 of the housing 12. With this arrangement, the independent mass member 16 is disposed within the housing space 14 of the housing 12 so as to be able to move relative to the housing 12 in the axial direction, in the axis-perpendicular direction (the radial direction) and in the circumferential direction.

The small gap 42 is formed in the space between the facing surfaces in the radial direction of the outer peripheral surface of the independent mass member 16 (i.e., of the striking rubber layer 34) and the inner peripheral surface of the housing 12, thereby ensuring an adequately large spring constant in the independent mass member 16 based on the desirably arranged amount of relative movement in the independent mass member 16 relative to the housing 12 in the radial direction, which is a primary vibration input direction. This arrangement permits that the natural frequency of the independent mass member 16 will be set to a frequency band that is higher than the natural frequency of the transmission case 18, which is the vibrating member whose vibration to be damped, at a frequency band of, for example, 400 to 1,000 Hz. Furthermore, when a vibration of 2G or more is applied, the metallic mass 32 undergoes jumping like displacement relative to the housing 12, via the striking rubber layer 34, to thereby repetitively strike the inner peripheral surfaces on both sides (i.e., both top and bottom in FIG. 1) in the primary vibration input direction. Preferably, the vibration-damping device 10 is arranged by utilizing a vibration multiplier (based on the resonance effect, etc.) in a mass-spring system comprising a mass of the independent mass member 16 and the spring of the striking rubber layer 34, so that when a 1G vibration is applied in the target frequency of vibration to be damped, the independent mass member 16 undergoes jumping like displacement, with the gap creation and impacts repeatedly performed on both sides of the independent mass member 16 in the vibration input direction.

Next there will be an explanation regarding a specific example of a method for manufacturing the vehicle vibration-damping device 10, including, for example, the method of forming the small gap 42, as described above. It should be appreciated that the present invention is in nowise limited to this specific example.

Figure 3:
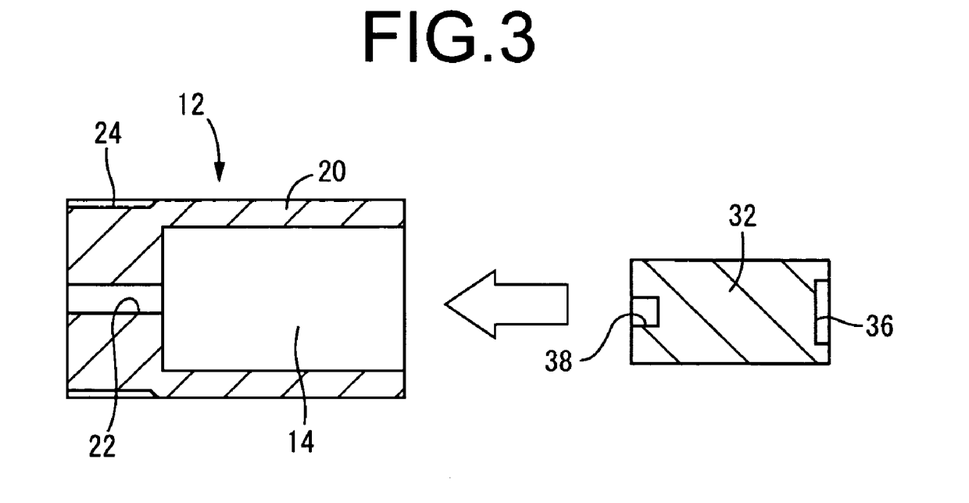
FIG. 3 is a vertical cross sectional view showing one process of a manufacturing method of the vibration-damping device of FIG. 1.
Figure 4:
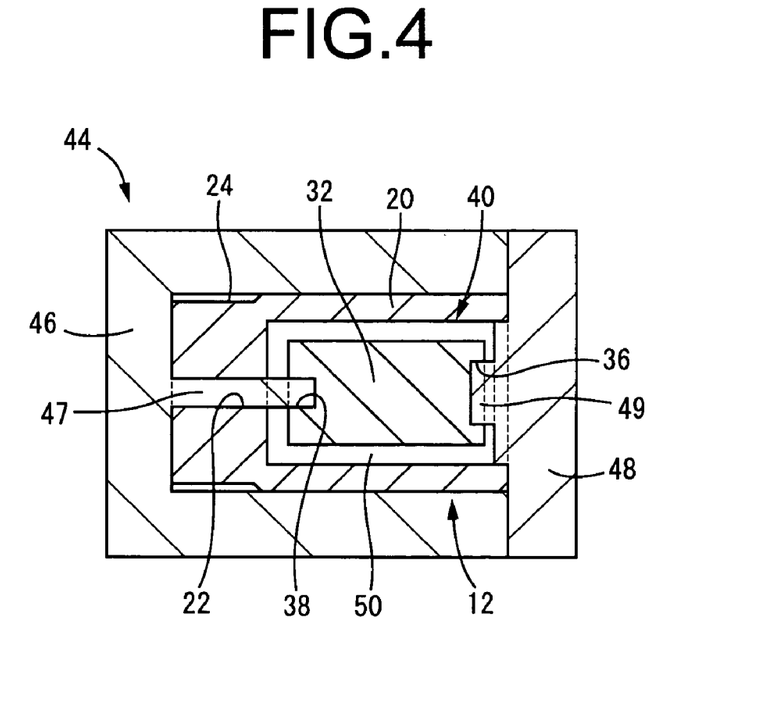
FIG. 4 is a vertical cross sectional view showing another process of the manufacturing method of the vibration-damping device of FIG. 1.

Initially, the housing 12, the metallic mass 32, and the cover member 26 are formed as individual units. As shown in FIG. 3, the metallic mass 32 is inserted into the housing 12 from an axial-direction end part wherein a small-diameter indentation 38 has been provided. Then, as shown in FIG. 4, the metallic mass 32 and the housing 12 are placed on a fabrication mold 44. The fabrication mold 44 includes a female mold 46 and a male mold 48. The female mold 46 and the male mold 48 fit together in the axial direction (the left and right in FIG. 4). On the inside of each mold, there are protrusions, indentations, and so forth that are fabricated appropriately according to the external geometries of the housing 12 and the metallic mass 32.

The metallic mass 32 and the housing 12 fit into indentations in the female mold 46 and the male mold 48. A support pin 47 that is fabricated on the female mold 46 is inserted into the through hole 22 of the housing 12 and the small-diameter indentation 38 of the metallic mass 32. Further, a support protrusion 49, fabricated on the male mold 48 is fitted into the large-diameter indentation 36 of the metallic mass 32. With this state, the female and male molds 46 and 48 are mated together to thereby form the gap 40 between the inner peripheral surface of the cylindrical wall part 20 of the housing 12 and the outer peripheral surface of the peripheral wall part of the metallic mass 32. In this state, the positioning of the metallic mass 32 and the housing 12 is maintained coaxially within the fabrication mold 44 to set the distance $d_1$ between the facing surfaces in the radial direction, to $0.5 \leq d_1 \leq 2$, and the gap 40 is partitioned by the fabrication mold 44 to fabricate a mold cavity 50.

Figure 5:
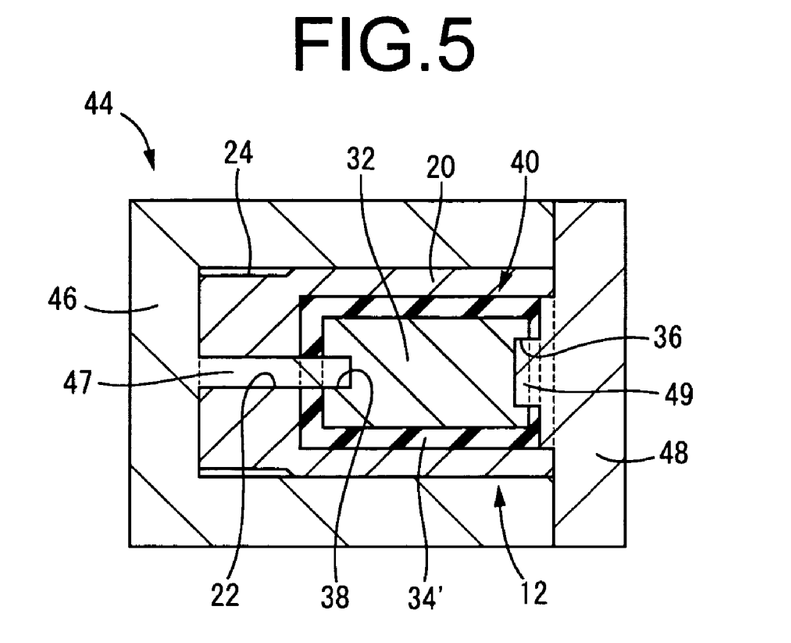
FIG. 5 is a vertical cross sectional view showing yet another process of the manufacturing method of the vibration-damping device of FIG. 1.

Under the conditions of mating and clamping the molds in this way, as shown in FIG. 5, a rubber material 34', such as natural rubber, butyl rubber, or the like is injected into the mold cavity 50 through an injection gate (not shown) formed in the fabrication mold 44. The rubber material 34' is subjected to a specific vulcanization molding process, to thereby form the striking rubber layer 34.

Figure 2:
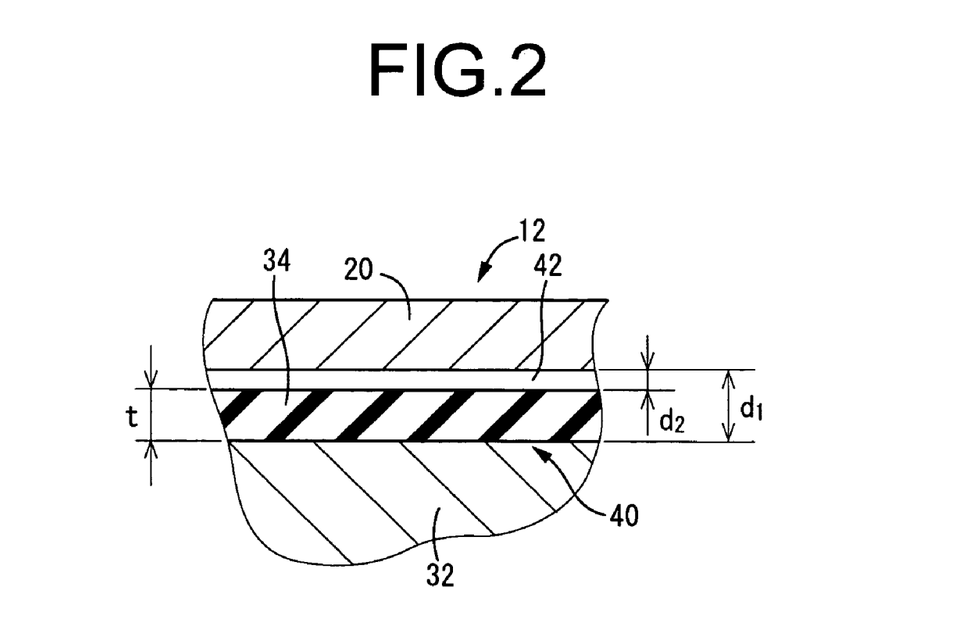
FIG. 2 is a fragmentary enlarged view in vertical cross section of a principle part of the vibration-damping device of FIG. 1.
Figure 6:
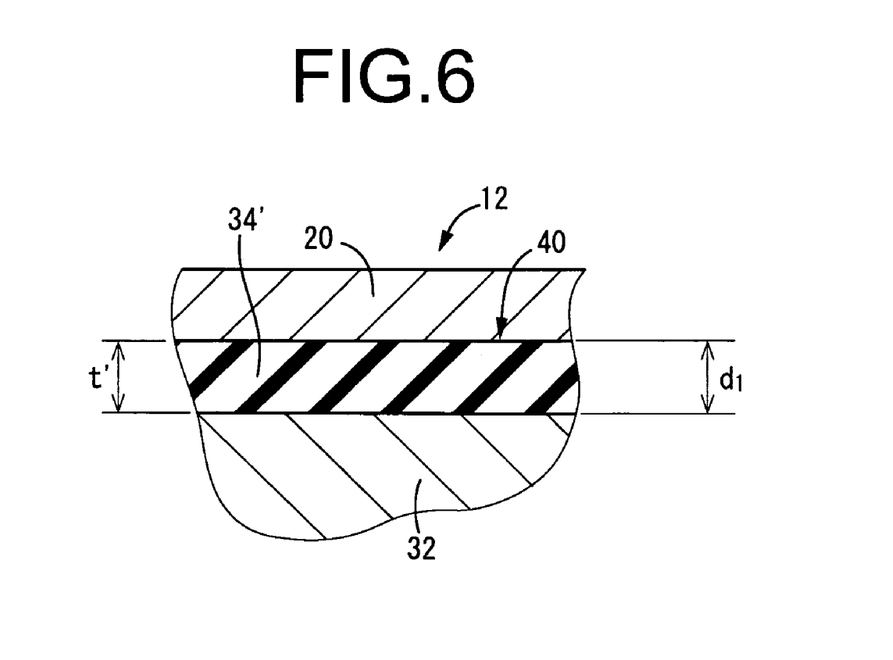
FIG. 6 is a fragmentary enlarged cross sectional view showing a principle part in the process in shown in FIG. 5.

As shown in FIG. 6, the result is that the rubber material 34', which has a thickness dimension of t' that is substantially the same as the distance d, between the radially facing surfaces, i.e., the outer peripheral surface of the metallic mass 32 and the inner peripheral surface of the housing 12, undergoes thermal contraction along with the vulcanization molding process, causing not only peeling thereof away from the inner peripheral surface of the housing 12, but also contract in terms of the radius towards the metallic mass 32, which is on the inside in the radial direction, until the thickness dimension of t, as shown in FIG. 2, is reached. With this arrangement, the striking rubber layer 34, with the thickness dimension of t, as shown in FIG. 1, is fabricated adhering to the surface of the metallic mass 32, forming the independent mass member 16, and forming the small gap 42, with the dimension $d_2$, between the outer peripheral surface of the independent mass member 16 and the inner peripheral surface of the housing 12.

The rate of thermal contraction of the striking rubber layer 34 in the vulcanization molding process may be adjusted as appropriate through, for example, changing the settings of the aforementioned shore D hardness according to the size required for the small gap 42, and thus it is not particularly limited. In the present embodiment, the thermal contraction ratio is set to between 1 and 5%, or preferably, is set to between 2 and 3%.

In the present embodiment, an adhesive agent is coated onto the outer peripheral surface of the metallic mass 32, onto which the striking rubber layer 34 will be adhered and fabricated, prior to the filling of the mold cavity 50 with the rubber material 34' in order to perform an adhesive treatment on the metallic mass 32 for the striking rubber layer 34. This treatment permits the striking rubber layer 34 to adhere more securely to the metallic mass 32.

Figure 7:
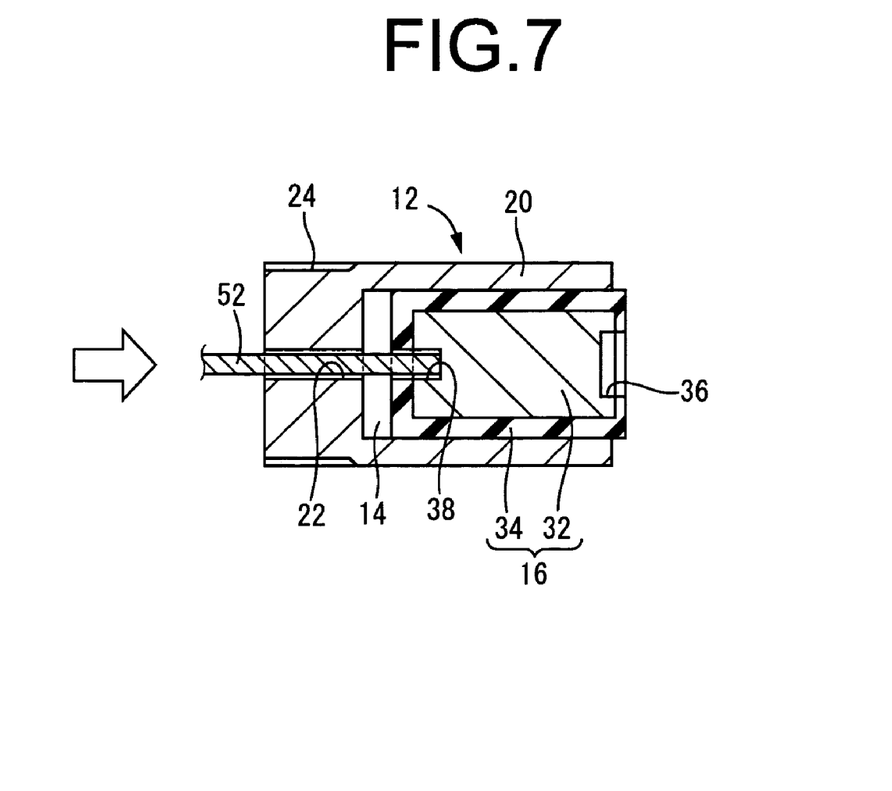
FIG. 7 is a vertical cross sectional view showing a further process of the manufacturing method of the vibration-damping device of FIG. 1.

The fabrication mold 44 is opened and the housing 12 housing the independent mass member 16 within the housing space 14, is removed. As shown in FIG. 7, for example, a push rod 52 is inserted into the through hole 22 of the housing 12 in order to place the tip part of this rod 52 in contact with the small-diameter indentation 38 of the metallic mass 32. With the housing is held immovable, a pushing force is applied against the independent mass member 16, based on the movement of the push rod 52 from one axial direction (the left in FIG. 7) towards the other axial direction (the right in FIG. 7) to force the independent mass member 16 and the housing 12 to move relative to each other in the axial direction. As a result, the outer peripheral surface of the striking rubber layer 34 can be peeled off from the inner peripheral surface of the housing 12 with more certainty.

Figure 8:
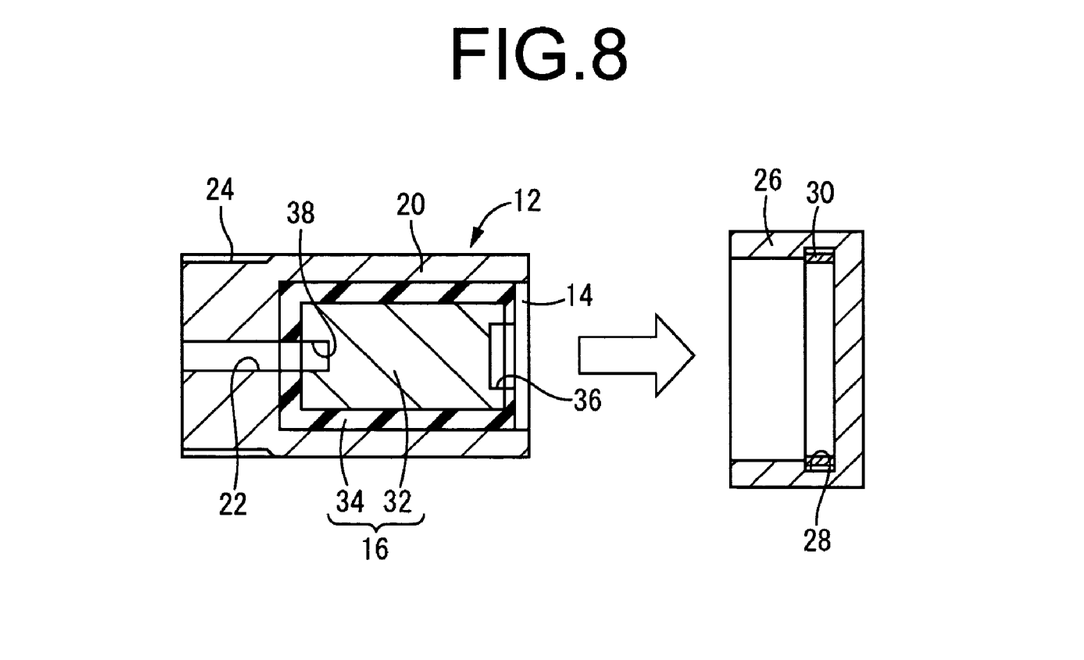
FIG. 8 is a vertical cross sectional view showing a still further process of the manufacturing method of the vibration-damping device of FIG. 1.

Furthermore, as is shown in, for example, FIG. 8, the push rod 52 is removed from the through hole 22, at which time the independent mass member 16 is moved towards the bottom part of the housing 12 and is disposed within the housing space 14. On the other hand, the stop ring 30 is fitted into the housing groove 48 of the cover member 26, establishing the relative positioning of the cover member 26 and a housing 12 in the axial direction. In a state where the cover member 26, etc., are held immovable, the housing 12 is press fitted into the cover member 26. The result is that the stop ring 30 is stretched in the outer radial direction by the housing 12, and is maintained tightly fitted onto the outer peripheral surface of the cylindrical wall part 20 of the housing 12 by the elastic effect of the stop ring 30. Thus, there is produced the vehicle vibration-damping device 10 as shown in FIG. 1.

In the vibration-damping device 10 of construction as described above, the male screw part 24 of the housing 12 is screwed tightly onto the female screw part (not shown) which is fabricated in the transmission case 18. Thus, the vibration-damping device 10 is fastened onto the free end of the transmission case 18 so that the axial direction of the vibration-damping device 10 extends in approximately the horizontal direction. In other words, the vibration-damping device 10 is installed on the transmission case 18 in a state where the primary vibration input direction, i.e., the primary direction in which vibrations are applied to the housing 12 is approximately the vertical direction (i.e., the radial direction of the casing 12).

In the state where the vibration-damping device 10 is equipped on the free end of the transmission case 18, when the transmission of vibrations from the automobile engine causes the transmission case 18 to apply a vibration in a direction that is perpendicular to the axial direction (i.e., the radial direction of the housing 12), which is the primary vibration input direction, then the housing 12 is vibrated together with the transmission case 18. As a result, the housing 12 and the independent mass member 16 move relative to each other in the direction in which the vibration is applied. Accordingly, the metallic mass 32 of the independent mass member 16 repetitively strikes, through the striking rubber layer 34, the inner peripheral surface of the housing 12 on both sides thereof in the direction of the vibration. At the time of this striking, the force of the shock that is applied to the transmission case 18 from the housing 12 exhibits an offsetting vibration-damping effect, based on the phase difference of the vibrations that derive from the transmission case 18.

In the vibration-damping device 10 according to the present embodiment, the cylindrical housing 12 and the metallic mass 32 with a circular cross section are used to cause the independent mass member 16 to be stable in striking the housing 12, while forming a small gap 42 wherein the gap in the radial direction between the facing surfaces of the striking rubber layer 34 and the housing 12 is no more than 0.1 mm. This arrangement creates a desirable striking of the independent mass member 16 against the inner peripheral surface of the housing 12 on both sides in the vibration input direction, with the help of the reduced amount of movement needed for the independent mass member 16 to come to impact against the inner peripheral surface of the housing 12 on both sides in the vibration input direction. Also, this arrangement makes it possible to effectively set the natural frequency of the independent mass member 16 to be in a frequency band that is higher than the natural frequency of the transmission case 18. Thus, it is possible to exhibit effectively vibration-damping performance even for vibrations in high frequency bands that were difficult to handle using vibration-damping devices with conventional structures.

Moreover, in the present embodiment, the rubber material 34' is filled into the gap 40 of 0.5 to 2 mm formed between the outer peripheral surface of the metallic mass 32 and the inner peripheral surface of the housing 12 in a state where the metallic mass 32 is disposed coaxially with the housing 12. With this arrangement, the outer peripheral side of the rubber material 34' is supported by the cylindrical housing 12, and the thermal contraction effect caused by the vulcanization molding process can be exerted on the striking rubber layer 34 (the rubber material 34') in a state where the metallic mass 32 of cylindrical cross section is embedded in the center of the rubber material 34'. This arrangement makes it possible for the striking rubber layer 34 to contract approximately uniformly around the entire periphery from the housing 12 that is on the outside in the radial direction towards the metallic mass 32, which is on the inside in the radial direction. Thus, a superior dimensional precision can be given to the small gap 42 which is fabricated between the outer peripheral surface of the striking rubber layer 34 and the inner peripheral surface of the housing 12.

Accordingly, it is possible to produce, beneficially, the vibration-damping device 10 equipped with the small gap 42, of the aforementioned 0.1 mm or less, having superior manufacturing efficiency and cost performance, and the like, of a degree not achieved in vibration-damping devices of conventional structures, and possible to obtain benefits in mass production as well. Namely, in the vibration-damping device of the conventional structure, for example, (1) a gap was formed between the outer peripheral surface of the striking rubber layer and the inner peripheral surface of the housing through positioning within the housing a metallic mass onto which a striking rubber layer had been adhered after fabricating the striking rubber layer and the metallic mass together in vulcanization molding. Alternatively, (2) only the rubber material that forms the rubber elastic member would be filled into the housing and then the thermal contraction that accompanies vulcanization molding of a single rubber elastic member would be used to dispose within the housing an independent mass member comprising the rubber elastic member but not equipped with a metallic mass, so as to form a gap between the outer peripheral surface of the independent mass member and the inner peripheral surface of the housing. However, the conventional devices of these structures have suffered from inherent problems. For instance, in the vibration-damping device of (1) it is difficult to fabricate a small gap of no more than 0.1 mm when there are minor shifts in dimensional tolerances of the housing, metallic mass, or striking rubber layers. Further, since the fabrication of these small gaps using sophisticated fabrication molds led to increased costs, there has been a problem that mass production could not be achieved at a fully practical level. Additionally, in the vibration-damping device of (2) the inside of the rubber material is not maintained by a metallic mass when the vulcanization molding of the rubber elastic member is performed within the housing. Therefore, when there would be external forces, such as vibrations, applied to the housing, or when the housing was at an angle relative to the horizontal direction, it was difficult to stabilize and maintain the rubber material within the housing, making it difficult to have a contraction that is uniform in the radial direction across the entirety of the rubber material, leading to a problem in that it is difficult to set the small gap to the target dimensions.

In the present embodiment, since the vibration-damping device 10 is disposed in a state where the primary vibration input direction will be approximately the vertical direction, when these are vibrations applied in excess of 2 G, the independent mass member 16 will repetitively strike the inner peripheral surface of the housing 12 on both sides in the vibration input direction. This causes the benefits of the independent mass member 16 striking both sides of the housing 12 even when a relatively small vibration has been applied, thereby making it possible for the target vibration-damping effects to exhibit even greater benefits.

Moreover, in the present embodiment, the push rod 52 is pushed against the independent mass member 16 through insertion through the through hole 22 of the housing 12 when performing the vulcanization molding of the striking rubber layer 34 between the inner peripheral surface of the housing 12 and the outer peripheral surface of the metallic mass 32. This therefore forcedly causes a relative movement between the housing 12 and the independent mass member 16 in the axial direction, causing the outer peripheral surface of the striking rubber layer 34 to peel more reliability from the inner peripheral surface of the housing 12 in order to fabricate more reliably the required small gap 42. Thus, it is possible to improve the reliability of the target vibration-damping effects more beneficially.

Furthermore, in the present embodiment, the through hole 22 is provided along the central axial direction at the bottom part of the housing 12 to be formed in a position that avoids the places wherein the independent mass member 16 strikes when a vibration is applied to the housing 12 in the main direction of vibration. Therefore, the shock force based on the independent mass member 16 striking the inner surface of the housing 12 is transmitted efficiently to the vibrating member for which the vibration is to be controlled (the transmission case 18 in the present example embodiment), thus making it possible for the vibration-damping effect to exhibit greater benefits.

Moreover, in the present embodiment, the outer peripheral surface of the striking rubber layer and the inner peripheral surface of the housing 12 are fabricated so as to extend in the axial direction with essentially uniform cross sections, and thus the small gap 42, formed between these inner and outer peripheral surfaces, extends across the entire length in the axial direction with an approximately uniform cross-sectional shape. Therefore, when a vibration is applied in the primary vibration input direction, the independent mass member 16 strikes against the housing 12 across approximately the entire length in the axial direction. Thus, it is possible to reduce or avoid the concentration of stresses in the independent mass member 16 and/or housing 12 that stem from one part of the independent mass member 16 striking a focused place on the inner surface of the housing 12, and it is possible to have a stabilized vibration-damping effect over extended periods of time.

Further, the fabrication of the striking rubber layer 34 over the outer peripheral surface of both axial-direction ends of the metallic mass 32 as well makes it possible to exhibit superior vibration-damping effects even regarding vibrations in the axial direction based on the striking of the inner surface of the bottom part of the cover member 26 and the inner surface of the bottom part of the housing 12 by the metallic mass 32 through the striking rubber layer 34 in the independent mass member 16 when a vibration is applied in the axial direction.

According to the manufacturing method of this embodiment of the present invention, not only is the distance $d_1$ between the opposing surfaces of the outer peripheral surface of the metallic mass 32 and the inner peripheral surface of the housing 12 set to between 0.5 and 2 mm in a state wherein the metallic mass 32 and the housing 12 are disposed coaxially, but also the thermal contraction accompanying the vulcanization molding of the striking rubber layer 34 is used to easily and reliably fabricate a small gap 42, of 0.1 mm or less, between the radially opposing surfaces, i.e., the outer peripheral surface of the independent mass member 16 (of the striking rubber layer 34) and the inner peripheral surface of the housing 12. As a result, it is not necessary to use, in particular, fabrication molds, or the like, with complicated structures or geometries, effectively reducing the manufacturing cost and the overhead in the manufacturing process, making it possible to provide superior mass production characteristics.

Figure 9:
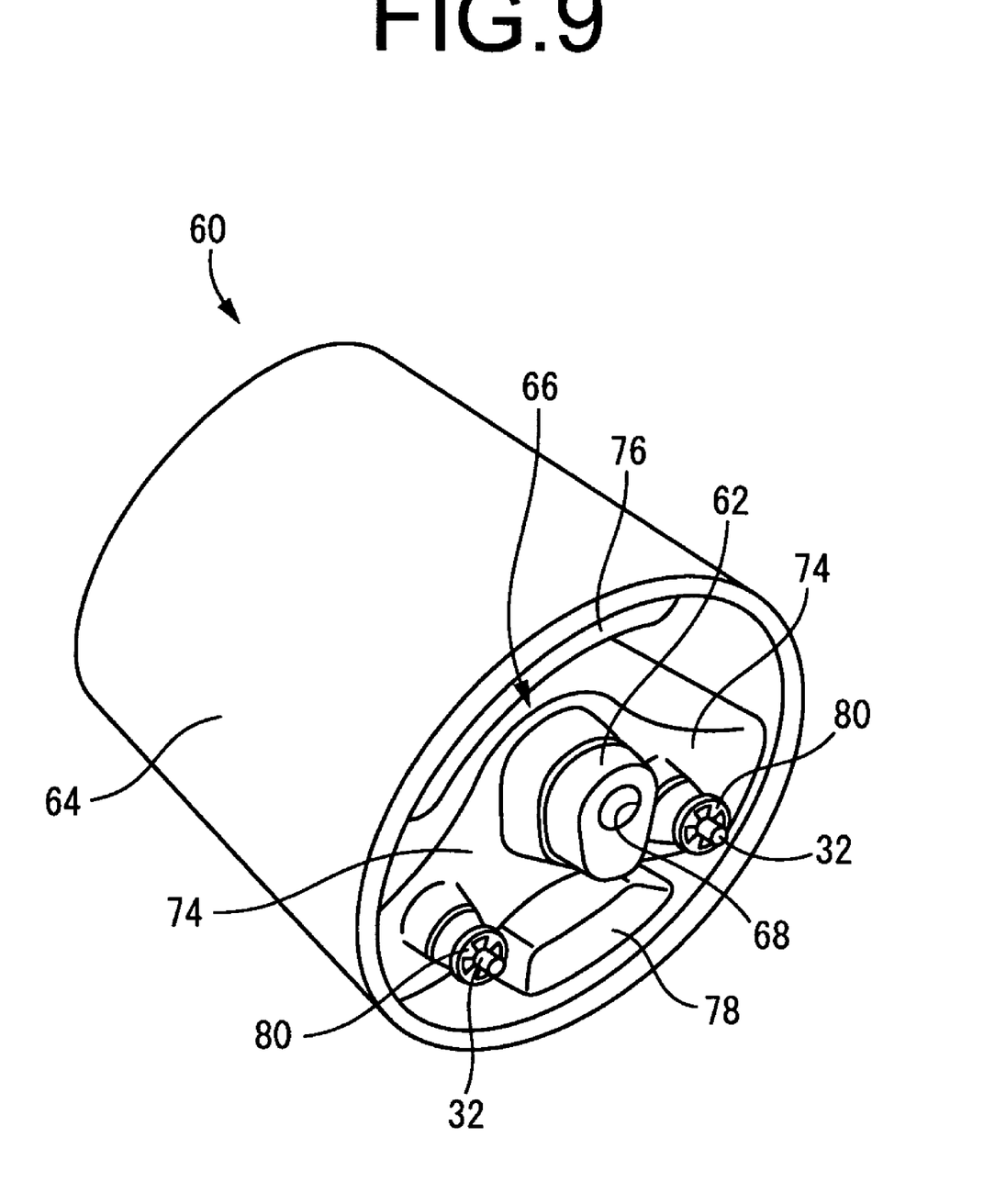
FIG. 9 is a perspective view showing a vehicle engine mount of construction according to a second embodiment of the present invention.
Figure 10:
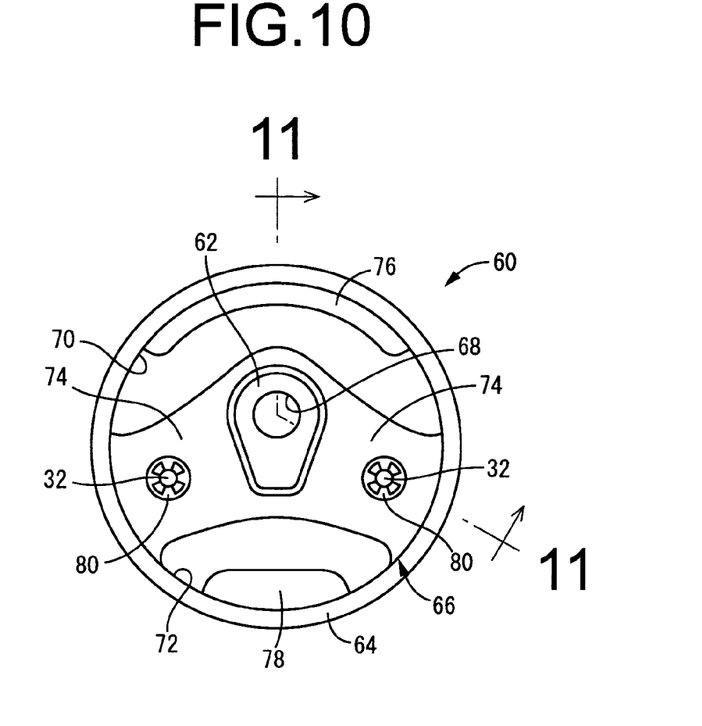
FIG. 10 is a front elevational view of the engine mount of FIG. 9.
Figure 11:
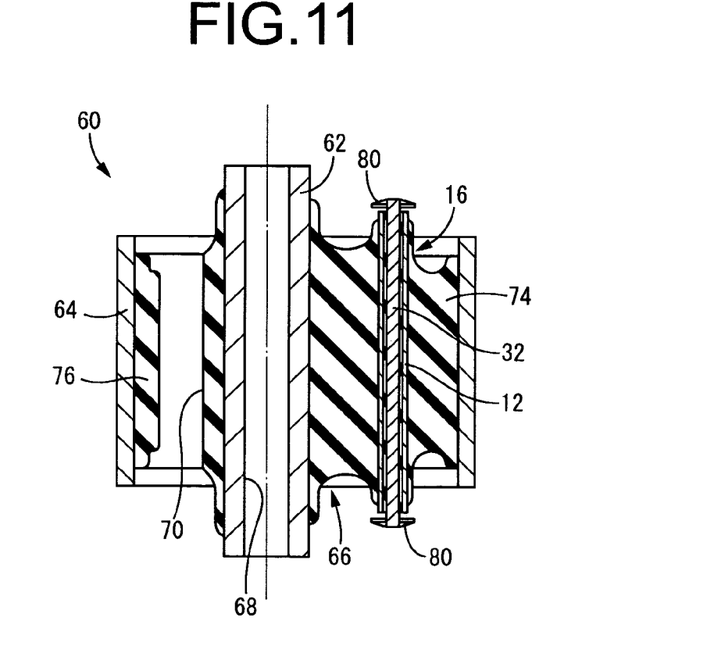
FIG. 11 is a cross sectional view taken along line 11-11 of FIG. 10.

Next, an engine mount 60 for an automobile is shown in FIGS. 9 through 11 as a second embodiment according to the present invention. This engine mount 60 has a structure wherein a metallic inner cylinder 62, as a first attachment member, and a metallic outer cylinder 64, as a second attachment member, are elastically connected by a rubber elastic member 66. Either the inner cylinder 62 or the outer cylinder 64 is attached to the power unit side (not shown), and the other cylinder is attached to the body side, so that the power unit is supported on the body in a vibration-damping fashion. The overall structure of this engine mount 60 is substantially the same structure as for the engine mount disclosed in, for example, JP-A-2002-227921, and thus detailed explanations thereof are omitted. In the description hereinbelow, the same numerals are assigned in the figures for those members and components that have substantially the same structures as in the first embodiment, and no detailed explanations thereof are provided.

In the engine mount 60, the inner cylinder 62 according to the present embodiment has a small-diameter inner cylinder shape, and is in a form wherein it can be securely attached to a body or power unit (not shown) by a bolt passing through an inner hole 68. In the outer radial direction of the inner cylinder 62 is disposed an outer cylinder 64, essentially coaxially with the inner cylinder 62.

The outer cylinder 64 has a large diameter approximately cylindrical shape. The outer cylinder 64 is formed so as to be able to be attached securely to an automobile body or power unit (not shown) through press fitting, or the like, to an attachment member that is securely attached to the automobile body or power unit.

Between the surfaces of the inner and outer cylinders 62 and 64, which oppose each other in the radial direction, is disposed the rubber elastic body 66. This rubber elastic body 66 has an essentially cylindrical shape in its wall, and it fabricated as an integrated vulcanization molded product equipped with the inner cylinder and outer cylinder 62 and 64, with the inner peripheral surface thereof bonded by vulcanization to the outer peripheral surface of the inner cylinder 62, and the outer peripheral surface thereof bonded by vulcanization to the inner peripheral surface of the outer cylinder 64.

The rubber elastic body 66 is equipped with a pair of slits 70 and 72 in the axial direction on both sides of the inner cylinder 62 in a primary vibration input direction in FIG. 10). While the load is applied (the top and the bottom in FIG. 10). While the slit 70 has a crescent shape in its cross section, extending around essentially half of the periphery, the slit 72 has a fan-shaped cross sectional shape.

In other words, the rubber elastic body 66 exists only between the pair of slits 70 and 72 in the inner and outer cylinders 62 and 64. Thus, the inner and outer cylinders 62 and 64 is substantially connected via the pair of elastic linking parts 74 and 74 that are fabricated so as to extend in the axial direction between the inner and outer cylinders 62 and 64. Moreover, in a state where this rubber elastic body 66 is equipped between the inner and outer cylinders 62 and 64, a static load is applied in the radial direction, and when the static load is applied, substantially a V shape is formed by the spreading of the elastic linking parts 74 and 74 that is wider in the direction in which the inner cylinder 62 moves relative to the outer cylinder 64. As a result, the tensile stress on the elastic linking parts 74 and 74 when a load is applied from the outside is reduced.

Further, stopper parts 76 and 78 are provided on the circumferential central portions of the inner peripheral surfaces of the slits 70, 72, respectively so as to protrude towards the inner cylinder 62 from the outer cylinder 64. These stopper parts 76 and 78 are integrally formed with the rubber elastic body 66. With this arrangement, since the inner cylinder 62 and the outer cylinder 64 striking each other through these stopper parts 76 and 78, the amount of relative movement in one of the axial directions that is the primary vibration input direction (the vertical direction in FIG. 10) is limited in a cushion-wise manner.

A housing 12 is equipped in the central area in the linking direction of each of the elastic linking parts 74, or in other words, in the central area between the radially opposing surfaces of the inner and outer cylinders 62 and 64. The housing 12 according to the present embodiment has an approximately cylindrical shape that is long in the axial dimension, and is disposed so as to extend substantially parallel to the axial direction of the mount (in the vertical direction in FIG. 11), while the outer peripheral surface thereof is vulcanized and adhered to the rubber elastic body 66.

An independent mass member 16, comprising a metallic mass 32 and a striking rubber layer 34, is disposed within the housing 12. The metallic mass 32 in the present embodiment has an approximately cylindrical shape that is long with a small diameter, disposed within the housing 12 with a distance $d_1$ between the radially opposing surfaces, i.e., the outer peripheral surface of the metallic mass 32 and the inner peripheral surface of the housing 12, under the conditions where the metallic mass 32 is disposed coaxially with the housing 12. Both axial end parts of the metallic mass 32 protrude to the outside in the axial direction from each of the opening parts in the housing 12. Also, at both tip parts, there are attached ring-shaped retainer members 80 that have external diameter dimensions that are larger than the diameter dimensions of the opening parts of the housing 12. As a result, the metallic mass 32 is prevented from falling out of the housing 12. Well-known speed nuts, push nuts, snap retainers, clip retainers, or the like may be used as appropriate as the retainer members 80.

Further, a thin striking rubber layer 34 covers essentially the entirety of the outer peripheral surface of the metallic mass 32. The striking rubber layer 34 has a thickness dimension (t) that is sustained as in the first embodiment, described above. In a state where the metallic mass 32 is disposed coaxially with the housing 12, the striking rubber layer 34 faces the housing 12 so that over the entire periphery there is a radial-direction distance $d_2$ between the facing surfaces of the outer peripheral surface of the striking rubber layer 34 and the inner peripheral surface of the housing 12. With this arrangement, a small gap 42 with a small dimension ($d_2$) is formed between the radially opposing surfaces, i.e., the external peripheral surface of the striking rubber layer 4 and the inner peripheral surface of the housing (See FIG. 13).

Figure 12:
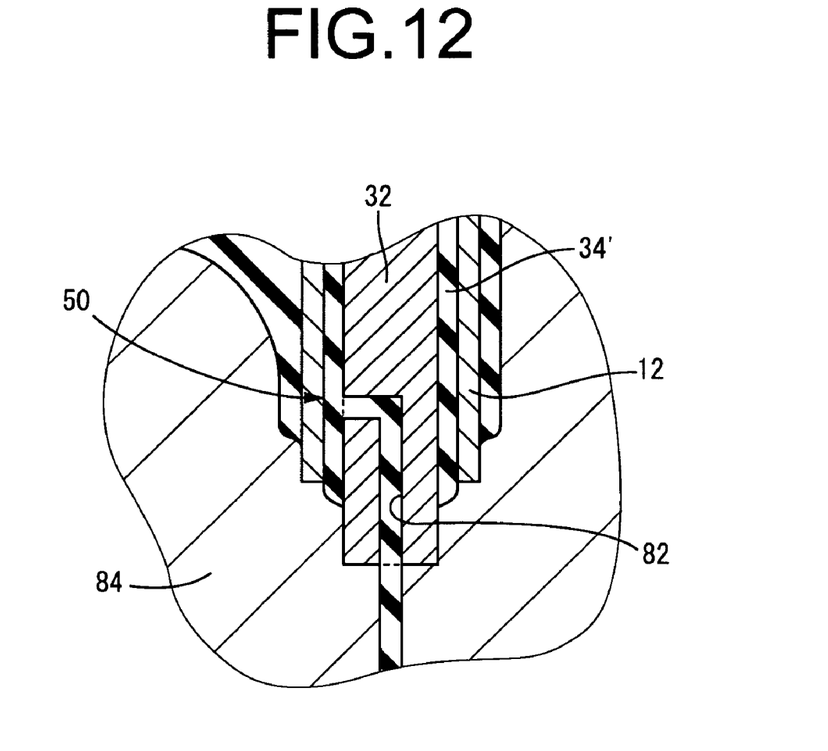
FIG. 12 is an enlarged cross sectional view showing one process of a manufacturing method of the engine mount of FIG. 9.
Figure 13:
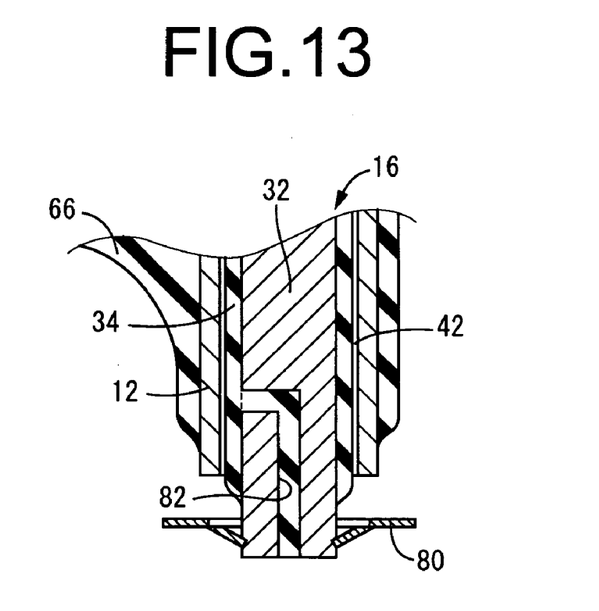
FIG. 13 is an fragmentary enlarged view in vertical cross section of the engine mount of FIG. 9.

In the present embodiment, a runner 82 for the injection of a rubber material 34' is formed at at least one of the axial ends of the metallic mass 32 as shown in FIGS. 12 and 13. This runner 82 for injection extends in the axial direction from the axial end surface of the metallic mass 32 with a specific depth dimension, and extends in the radial direction to open in the outer peripheral surface of the metallic mass 32.

The inner cylinder 62 and the outer cylinder 64 are placed in the fabrication mold 84 for molding the rubber elastic body 66 as shown in FIG. 12. When molding the rubber elastic body 66 by means of vulcanization of a suitable rubber material, the housing 12 with the metallic mass 32 coaxially housed therein, is placed at a predetermined position located in the central portion in the linking direction of each of the elastic linking parts 74 between the inner cylinder 62 and the outer cylinder 64. The rubber material for the rubber elastic body 66 is filled into the radial space between the inner cylinder and the outer cylinder through an injection gate (not shown) that is formed in the injection mold 84. After filling a portion of the rubber material through the injection runner 82 of the metallic mass 32 from the injection mold 84 into a mold cavity 50 that is formed between the radial-direction opposing surfaces of the metallic mass 32 and the housing 12, a specific vulcanization molding process may be performed.

As shown in FIG. 13, for example, the thermal contraction that accompanies vulcanization fabrication of the striking rubber layer 34, is used to have the striking rubber layer 34 peeled off of the housing 12 as well as to have the striking rubber layer contracted towards the metallic mass 32 and adhered firmly to the outer peripheral surface of the metallic mass 32. Thus, the small gap 42 between the radially opposing surfaces, i.e., the outer peripheral surface of the striking rubber layer 34 and the inner peripheral surface of the housing 12, will be fabricated together with the rubber elastic body 66. Namely, in the present embodiment, not only is an adhesive material coated onto the outer peripheral surface of the housing 12, but also, in the same manner as in the embodiment described above, an adhesive material is also coated onto the outer peripheral surface of the metallic mass 32, in advance, when performing the vulcanization molding of the striking rubber layer 34. In the present embodiment, the release of the striking rubber layer 34 from the housing 12 can be performed more reliably by forcibly moving the independent mass member 16 and the housing 12 relative to each other in the axial direction and/or peripheral direction, if necessary, after the vulcanization molding of the striking rubber layer 34.

The engine mount 60 of construction according to this embodiment is installed between the power unit and the vehicle body in a state where the primary vibration input direction will be approximately the vertical direction (the direction that is approximately perpendicular to the axial direction of the mount 60). In the engine mount 60, a vibration is applied between the inner cylinder 62 and the outer cylinder 64, and when there is no surging phenomenon in the elastic linking part 74, the elastic linking part 74 will be vibrated with a large amplitude vibration in the shear direction. Thus, the external forces in the direction perpendicular to the axial direction of the independent mass member 16 from the elastic linking part 74 relative to the independent mass member 16 will be large, and the independent mass member 16 will become independent from the inner peripheral surface of the housing 12 and bounced within the housing 12 so as to repetitively strike the housing 12 in the direction of the shear deformation of the elastic linking part 74, which is the primary vibration input direction. In other words, the independent mass member 16 exhibits a vibration amplitude control effect and/or a vibration-damping effect relative to the elastic displacement of the rubber elastic body 66 accompanying the application of vibrations based on the metallic mass 32 repetitively striking the inner peripheral surface of the housing 12 at both sides, in the vibration input direction through the striking rubber layer 34, to thereby suppress the surging in the rubber elastic body 66.

Consequently, in the engine mount 60, structures as described above, there is minimized or avoided reduction in the anti-vibration function stemming from the surging phenomenon of the rubber elastic body 66 at specific frequency ranges. As a result, the anti-vibration effects based on the elastic characteristics of the rubber elastic body 66 can exhibit stability relative to vibrations in a broad range of frequencies.

In the present embodiment, particularly, the small gap 42 is fabricated in the same manner as in the first embodiment between the radially opposing surfaces of the inner peripheral surface of the housing 12 and the outer peripheral surface of the metallic mass 32. Therefore, it is possible to set with ease the natural frequency of the independent mass member 16 to a frequency band that is higher than the natural frequency of the vehicle body or the like, for which the vibrations are to be controlled. Also, it is possible to produce the mount 60 with superior mass production properties wherein the surging suppression effects exhibit their benefits because the gap 42 can be produced easily and with high precision.

While presently preferred embodiments of the invention have been described in detail hereinabove, for illustrative purpose only, it is to be understood that the present invention is not limited to the details of the illustrated embodiments, but may be otherwise embodied with various other changes, modifications and improvements, which may occur to those skilled in the art, without departing from the spirit and scope of the invention.

For instance, in the illustrated embodiments, there is employed a process wherein the independent mass member 16 and the housing 12 are moved in the axial direction relative to each other using the push rod 52 after vulcanization molding of the striking rubber layer 34 in order to caused the striking rubber layer 34 to peel more reliably from the housing 12. However, there is no need to perform this process when, for example, the striking rubber layer 34 peels reliably from the housing 12 when the initial vibration is applied.

In the first embodiment, the push rod 52 prepared separately was used to move the independent mass member 16 and the housing 12 relative to each other. Instead, a stop part may be fabricated in the large-diameter indentation part 36 of the metallic mass 32 and a stop member fabricated separately may be stopped by the stop part to move the stop member in the rotational direction or the axial direction. Alternatively, a stop member is formed by utilizing the support protrusions 49 of the male mold 48 of the fabrication mold 44, and during opening the fabrication mold 44 after the vulcanization molding process, the independent mass member 16 is moved together with the mold 48 so that the independent mass member 16 and the housing 12 undergoes relative movement in the axial direction. Yet alternatively, a structure may be used wherein there can be stretching and/or compression of the support pin 47 of the fabrication mold 44 that is inserted into the insertion hole 22 of the housing 12, and then to move the support pin 47 in the axial direction to force relative motion, in the rotational direction and/or axial direction, of the independent mass member 16 and the housing 12.

In the illustrated embodiments, while the process of adhering the striking rubber layer 34 onto the metallic mass 32 is performed, the non-adhesion process for the striking rubber layer 34 on the housing 12 was not performed. However, in addition to, or instead of, the adhesion process for the metallic mass 32, a non-adhesion process may be performed on the housing 12 by coating a releasing agent onto the inner peripheral surface of the housing 10 when performing the vulcanization molding of, for example, the striking rubber layer 34.

In the second embodiment, the rubber material 34' for the striking rubber layer 34 is filled into the mold cavity 50 through the runner 82 for injection fabricated in the metallic mass 32. However, instead the rubber material 34' may be filled into the mold cavity 50 through a separate runner, or the like, fabricated in the fabrication mold 84 that opens directly into the space between the radially opposing surfaces of the metallic mass 32 and the housing 12.

Furthermore, in the second embodiment, the rubber elastic body 66 and the striking rubber layer 34 were integrated. However, the fabrication of the striking rubber layer 34 may be performed in a separate process from the fabrication of the rubber elastic body 66. Specifically, after the vulcanization molding of the rubber elastic body 66, the inner cylinder 62 and outer cylinder 64, and housing 12 may be placed on a fabrication mold that has been prepared separately from the integrally vulcanized product of the rubber elastic body 66, the metallic mass 32 may be disposed within the housing 12 so that the housing 12 and the metallic mass 32 are disposed coaxially, and then the striking rubber layer 34 may be vulcanization molded. Conversely, prior to the vulcanization molding of the rubber elastic body 66, the metallic mass 32 may be disposed within the housing 12 so that the housing 12 and the metallic mass 32 are disposed coaxially and the striking rubber layer 34 may be molded by vulcanization. After the vulcanization, the independent mass member 16, having the striking rubber layer 34 fabricated covering the metallic mass 32, is removed from the housing 12 in the axial direction and then. After vulcanization molding of the inner and outer cylinders 62 and 64 and the housing 12 to integrate with the rubber elastic body 66, the independent mass member 16 that had been removed may be then disposed within the housing 12.

Moreover, the shape, size, and so forth of the metallic mass 32, the housing 12, and the small gap 42 may be changed as appropriate depending on the required anti-vibration characteristics and product characteristics, and the like, and are not limited to the illustrative cases presented herein.

In addition to the engine mount 60 for an automobile or the vibration-damping device 10 that are attached to the transmission case 18 of an automobile as in the illustrated embodiment, the present invention may be similarly applied to body mounts and member mounts, cab mounts, strut bar cushions, etc., or to fluid-filled cylindrical mounts.

What is claimed is:

1. A method of manufacturing a vehicle vibration-damping device comprising:

a gap fabricating process that fabricates a gap of 0.5-2 mm between an inner peripheral surface of a rigid housing and an outer peripheral surface of a metallic mass by rigidly positioning the housing having an inner peripheral surface of cylindrical shape and the metallic mass having a cylindrical cross section relative to a vulcanization fabrication mold for fabricating a rubber elastic body layer while by disposing the metallic mass coaxially disposed within the housing;

a rubber elastic body layer fabricating process wherein a rubber material is filled into the gap, and then is vulcanized to mold the rubber material within a mold cavity that is formed between the housing and the metallic mass in order to fabricate the rubber elastic body layer; and a small gap fabricating process that fabricates a small gap of no more than 0.1 mm between the outer peripheral surface of the rubber elastic body layer and the inner peripheral surface of the housing that are opposed to each other in a radial direction, under a condition of the metallic mass being disposed coaxially within the housing, by utilizing a thermal contraction of the rubber elastic body layer to both peel the rubber elastic body layer from the housing and to adhere the rubber elastic body layer by means of reduction of an diameter thereof towards the metallic mass, wherein a natural frequency of an independent mass member that is formed by a tight adherence of the rubber elastic body layer to the outer peripheral surface of the metallic mass is set to be at a frequency band that is higher than a frequency of a target vibration that is to be damped for a vibrating member so that, upon application of the target vibration, the independent mass member repetitively strikes the inner surfaces of the housing on both sides in a primary vibration input direction.

2. A method of manufacturing a vehicle vibration-damping device according to claim 1, further comprising a preliminary process that performs at least one of an adhesion treatment for ensuring an adhesion of the rubber elastic body layer to the metallic mass, and a non-adhesion treatment for ensuring a non-adhesion of the rubber elastic body layer to the housing, prior to the rubber elastic body layer fabricating process.

3. A method of manufacturing a vehicle vibration-damping device according to claim 1, further comprising a release process that forcibly causes a relative movement between the rubber elastic body layer and the housing in at least one of a circumferential direction and an axial direction, and that is executed posterior to the rubber elastic body layer fabricating process.

* * * * *